US 9,909,523 B1

(12) United States Patent
Glugla et al.

(10) Patent No.: US 9,909,523 B1
(45) Date of Patent: Mar. 6, 2018

(54) METHODS AND SYSTEMS FOR ENGINE FUELING

(71) Applicant: Ford Global Technologies, LLC, Dearborn, MI (US)

(72) Inventors: Chris Paul Glugla, Macomb, MI (US); Nelson William Morrow, Jr., Saline, MI (US); Michael Damian Czekala, Canton, MI (US); Garlan J. Huberts, Milford, MI (US); Jianwen James Yi, West Bloomfiled, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/286,355

(22) Filed: Oct. 5, 2016

(51) Int. Cl.
*F02D 41/40* (2006.01)
*F02B 17/00* (2006.01)
*F02D 41/26* (2006.01)
*F02D 41/38* (2006.01)

(52) U.S. Cl.
CPC .......... *F02D 41/401* (2013.01); *F02B 17/005* (2013.01); *F02D 41/26* (2013.01); *F02D 2041/389* (2013.01)

(58) Field of Classification Search
CPC ...... F02D 41/40; F02D 41/401; F02D 41/402; F02D 41/403; F02D 41/30; F02D 41/26; F02D 2041/389; F02B 17/005
See application file for complete search history.

(56) References Cited

U.S. PATENT DOCUMENTS

| | | | |
|---|---|---|---|
| 5,617,829 A | 4/1997 | Bidner et al. | |
| 6,513,320 B1* | 2/2003 | Nishimura | ............ F01N 3/0842 123/299 |
| 6,705,274 B2 | 3/2004 | Kubo | |
| 6,736,108 B2 | 5/2004 | Rayl et al. | |
| 6,769,403 B2 | 8/2004 | Rayl et al. | |
| 7,028,661 B1 | 4/2006 | Bonne et al. | |
| 7,047,945 B2 | 5/2006 | Ishii et al. | |
| 7,234,440 B2 | 6/2007 | Hilditch | |
| 7,255,080 B1 | 8/2007 | Leone | |
| 8,132,556 B2 | 3/2012 | Glugla et al. | |
| 8,387,587 B2* | 3/2013 | Ogata | ................... F02B 23/104 123/299 |
| 8,447,496 B2* | 5/2013 | Krengel | ................ F02D 19/061 123/304 |

(Continued)

OTHER PUBLICATIONS

Liu, Chingpo, et al., "Method and System for Engine Cold-Start Control," U.S. Appl. No. 14/733,196, filed Jun. 8, 2015, 36 pages.

(Continued)

*Primary Examiner* — Hieu T Vo
(74) *Attorney, Agent, or Firm* — Julia Voutyras; McCoy Russell LLP (57) ABSTRACT

Methods and systems are provided for controlling spark plug fouling in newly manufactured vehicles. In one example, a method may include operating an engine with a first direct injection fueling strategy including single intake direct injection on an engine start when in a pre-delivery state, and transitioning to a second different direct injection fueling strategy including split direct injection on the engine start when in a post-delivery state. In this way, spark plug fouling may be avoided in newly manufactured vehicles.

20 Claims, 4 Drawing Sheets

(56) References Cited

U.S. PATENT DOCUMENTS

| | | |
|---|---|---|
| 8,474,432 B2 | 6/2013 | Storhok et al. |
| 8,712,669 B2 | 4/2014 | Krengel et al. |
| 8,977,472 B2 | 3/2015 | Kita |
| 9,255,541 B2 * | 2/2016 | Surnilla ............ F02D 41/3094 |
| 9,303,577 B2 | 4/2016 | Surnilla et al. |
| 2011/0184629 A1 | 7/2011 | Krengel et al. |
| 2014/0316673 A1 | 10/2014 | Glugla et al. |
| 2014/0343827 A1 | 11/2014 | Glugla et al. |
| 2015/0176508 A1 | 6/2015 | Glugla et al. |
| 2015/0176558 A1 | 6/2015 | Glugla et al. |
| 2016/0146126 A1 | 5/2016 | Glugla |
| 2016/0146127 A1 | 5/2016 | Glugla |

OTHER PUBLICATIONS

Pursifull, Ross Dykstra, et al., "Systems and Methods for Fuel Injection," U.S. Appl. No. 14/750,232, filed Jun. 25, 2015, 125 pages.

Glugla, Chris Paul, et al., "Method and System for Detection of Hot Spark Plug Fouling," U.S. Appl. No. 14/755,980, filed Jun. 30, 2015, 39 pages.

Thomas, Joseph Lyle, et al., "Methods and Systems for a Dual Injection Fuel System,"U.S. Appl. No. 14/803,853, filed Jul. 20, 2015, 63 pages.

Glugla, Chris Paul, et al., "Method and System for Ignition Control," U.S. Appl. No. 14/814,289, filed Jul. 30, 2015, 49 pages.

Glugla, Chris Paul, et al., "Method and System for Ignition Control," U.S. Appl. No. 14/814,764, filed Jul. 31, 2015, 38 pages.

Glugla, Chris Paul, et al., "Method and System for Engine Control," U.S. Appl. No. 15/181,198, filed Jun. 13, 2016, 54 pages.

Glugla, Chris Paul, et al., "Method and System for Spark Plug Cleaning," U.S. Appl. No. 15/340,190, filed Nov. 1, 2016, 50 pages.

* cited by examiner

METHODS AND SYSTEMS FOR ENGINE FUELING

FIELD

The present description relates generally to methods and systems for fueling an engine of a vehicle after vehicle assembly.

BACKGROUND/SUMMARY

Engine ignition systems may include a spark plug for delivering an electric current to a combustion chamber of a spark-ignited engine to ignite an air-fuel mixture and initiate combustion. Based on engine operating conditions, spark plug fouling can occur wherein a firing tip of the spark plug insulator becomes coated with a foreign substance, such as fuel, oil, or soot. Once fouled, the spark plug may be unable to provide adequate voltage to trigger cylinder combustion until the spark plug is sufficiently cleaned or replaced. For example, the spark plug may be cleaned by burning off the soot accumulated on the fouled spark plug by operating the engine in speed-load conditions that sufficiently raise the spark plug tip temperature.

One example approach for spark plug cleaning is shown by Glugla et al in U.S. Pat. No. 8,132,556. Therein, based on the severity of the spark plug fouling, progressively aggressive actions are taken to burn off the accumulated soot. In particular, spark plug tip temperature is raised using a combination of spark timing advance, increase in engine load, increase in engine speed, etc.

However, the inventors herein have identified potential issues with such an approach. As one example, spark plug fouling may occur while the engine is still at an assembly plant, before vehicle delivery to a customer. At the assembly plant, the vehicle may be started multiple times for short durations due to the vehicle being moved around to multiple stations or lots. In addition, the vehicle may be started intermittently to test out engine components. The frequent, short engine operation may generate excess soot, which can accumulate on the spark plug. However, since the engine is not operated sufficiently long in speed-load regions that allow the spark plug to be warmed, the accumulated soot is not sufficiently burned off, resulting in spark plug fouling. The cooler spark plug tip temperatures can exacerbate the spark plug fouling issue. As a result, when the vehicle leaves the assembly plant, the spark plug may be fouled or prone to fouling. As such, a fouled spark plug can make the engine more difficult to start. In addition, the fouled spark plug can result in low mile warranty issues.

In one example, the issues described above may be addressed by a method for controlling fuel injection to an engine via a direct injector (DI), comprising, operating an engine with a first direct injection fueling strategy including single direct injection during the intake stroke on an engine start when in a pre-delivery state, and operating the engine with a second, different direct injection fueling strategy including split direct injection on the engine start when in a post-delivery state. In this way, in engines configured with only DI, soot fouling of spark plugs of a green engine can be reduced. However, in engines configured with both DI and port fuel injectors (PFI), fuel may be injected to the engine via the port injector while priming the direct injection fuel rail when the engine is in the pre-delivery state. Thus, by injecting via only port injection and priming a direct injection fuel rail, a priming time required is reduced and a time a vehicle spends at a plant after being assembled can be reduced. In this way, pre-delivery state fueling strategies may be adjusted based on fueling capabilities of the engine system. As one example, following vehicle assembly in an assembly plant (e.g., where the engine is green and in a pre-delivery state), the vehicle may be moved to a station where the engine is to be started for a first time (that is, a very first combustion event of the engine is commanded with no prior combustion event in the engine, the very first combustion event commanded on a very first start of the engine since initial vehicle assembly). At that station, on the very first combustion event, the engine may be fueled using a first direct fueling strategy that includes single intake stroke direct injection. Additionally, the timing of the intake stroke injection may be advanced so that the intake injection occurs earlier in the intake stroke of the first combustion event. This ensures that there is sufficient time for the fuel and air to mix thoroughly before the spark event, thereby reducing rich fuel pockets in the chamber, which could otherwise foul the spark plug. The single intake stroke direct injection may optionally be continued for a first number of combustion events since the very first combustion event of the green engine, or for a first number of starts since the very first engine start since vehicle assembly. After the first start (or first number of starts), or once the engine has left the assembly plant (e.g., delivered to the customer or dealership), when the engine is in a post-delivery state, the engine may be fueled using a second, different fueling strategy. Therein, during an engine start, the engine may be fueled via direct injection on a first combustion event, wherein the direct injection strategy includes a first intake stroke injection followed by a second compression stroke injection. In addition, the split direct injection may include one or more lean injections during the intake stroke and one or more rich injections during compression to make air fuel ratio locally near the plug richer than the overall mixture. By splitting the direct injection in the post-delivery state of the engine, the catalyst light-off temperature can be raised without increasing exhaust particulate matter emissions and degrading engine combustion stability.

In this way, a fueling strategy may be adjusted in DI-only systems when the engine is in a pre-delivery state. The technical effect of using a single intake stroke direct injection fueling strategy wherein the timing injection is advanced during engine pre-delivery state is that sufficient time may be provided for mixing the injected fuel with air in the cylinder before a cylinder spark event. As a result, there may be fewer pockets of rich combustion, and hence reduced soot emissions, despite the occurrence of multiple engine operations of short duration. By reducing soot emissions, the likelihood of spark plug fouling is reduced. However, in engine systems configured with both DI and PFI capabilities, fuel may be delivered via PFI during pre-delivery and then transitioned to DI post-delivery. In this way, fueling strategies may be adjusted based on fueling capabilities of the engine system. Overall, engine component life may be enhanced and warranty issues may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
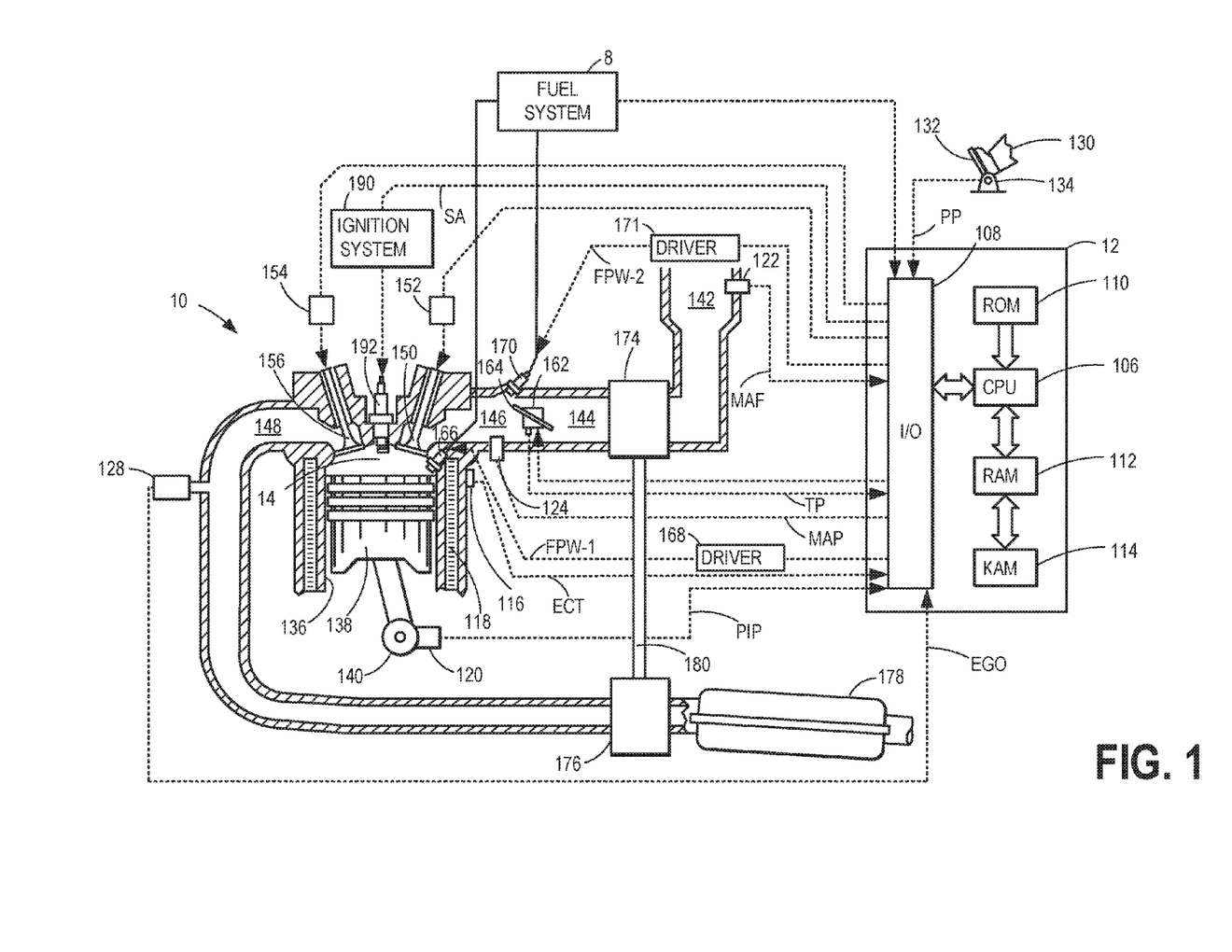
FIG. 1 schematically depicts an example embodiment of a cylinder of an internal combustion engine.
Figure 2A:
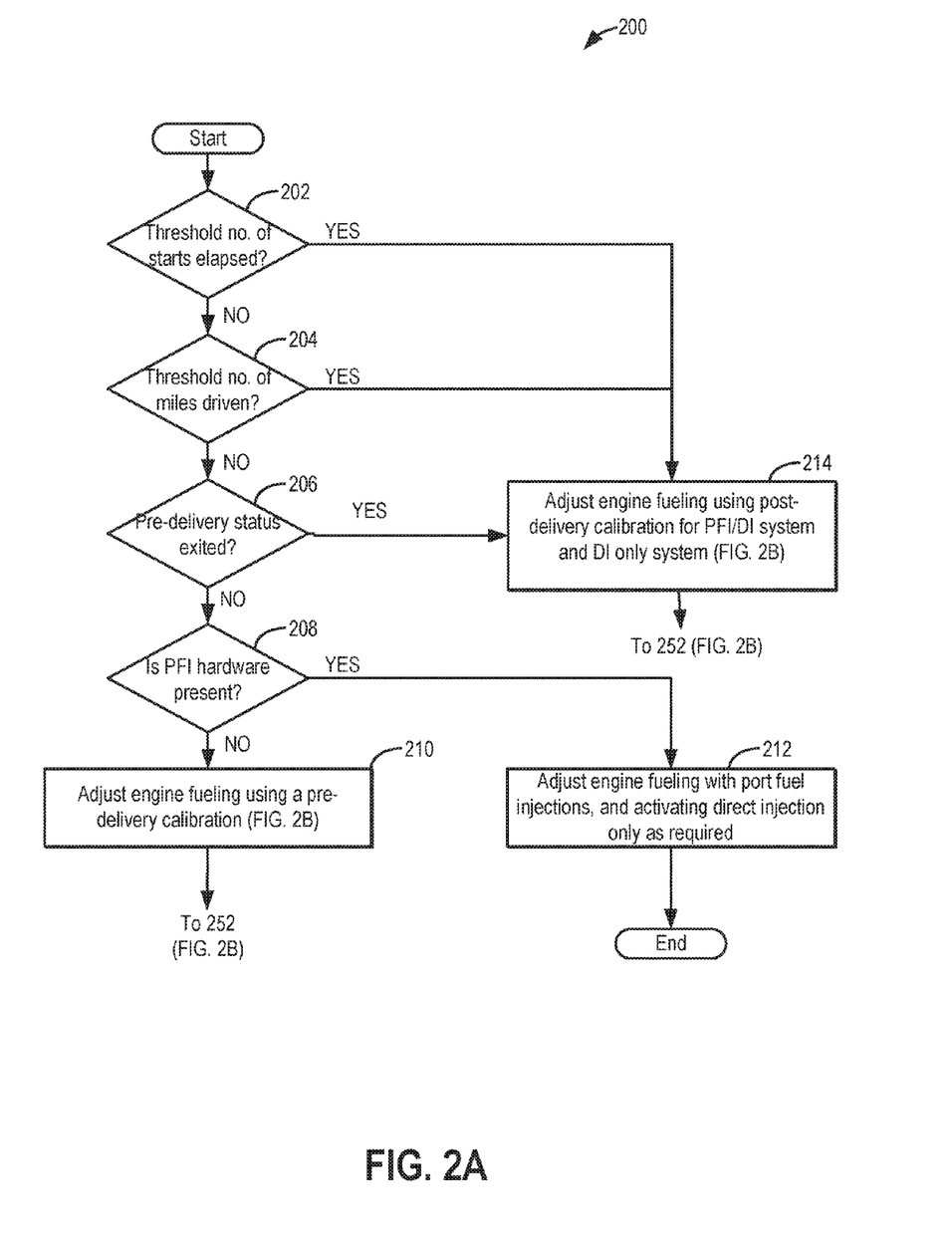
FIG. 2A depicts a flow chart of a method for selecting a fuel delivery strategy based on single or dual fuel capabilities of the engine.

The following description relates to systems and methods for adjusting a fuel injection strategy to reduce soot emissions in an engine, such as in the engine system of FIG. 1. An engine controller may be configured to perform a control routine, such as the example routine of FIG. 2A to determine fueling strategy based on single or dual fueling capabilities of the engine system. In the engine system including a port fuel injector (PFI), and a direct injector (DI), the engine controller may fuel the engine with the PFI when the vehicle is still in an assembly plant, while intermittently enabling the DI as shown in FIG. 2A. However, in engine systems including only direct injectors, the engine controller may be configured to perform a control routine, such as the example routine of FIG. 2B, to operate with a single intake stroke direct injection strategy during engine starts where there is a higher propensity for spark plug fouling, such as during an initial start of the engine following vehicle assembly at an assembly plant. Thereafter, the controller may transition to fueling the engine with a split direct injection strategy including intake stroke direct injection and compression stroke direct injection during engine starts where there is a lower propensity for spark plug fouling, such as when the engine is started after it has left the assembly plant. Example fuel injection profiles that may be used at different engine start events in PFI-DI and DI only engines is shown with reference to FIG. 3.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three-way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher-octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In general, the spark plug may deliver an electric current to the combustion chamber of a spark-ignited engine to ignite an air-fuel mixture and initiate combustion. However, when a firing tip of the spark plug insulator becomes coated with a foreign substance, such as fuel, oil, or soot, spark plug fouling may occur. The issue of spark plug fouling may be exacerbated when the engine is in a pre-delivery state (e.g., green engine), that is, when the engine is coupled in a vehicle at an assembly plant, before delivery to a customer. At the assembly plant, the vehicle may be started and stopped multiple times. This generates excess soot, which in turn can foul the spark plug. Since the engine may not be operated sufficiently long in speed-load regions that allow the spark plug to be warmed and the accumulated soot to be burned off, the resulting cooler spark plug tip temperature can exacerbate the spark plug fouling issue. The inventors have recognized that it may be possible to adjust the fueling strategies based on the fuel injection capabilities of the engine as shown in FIG. 2A. For example, in vehicles configured with an engine having dual fuel injection capabilities, responsive to determining that the engine in pre-delivery state, port fuel injectors may be activated while direct fuel injectors may be intermittently enabled to allow air in the fuel rail to be purged into the combustion chamber. In engines having only DI fuel injectors, spark plug fouling during pre-delivery may be reduced by delivering fuel via only single intake stroke direct injection on a first combustion event during pre-delivery state (such as on an initial engine start following vehicle assembly at a plant), and via at least split direct injection on a first combustion event during post-delivery conditions (e.g., when the vehicle has left the assembly plant and delivered to the customer), as elaborated at FIGS. 2B and 3. When split DI is used, the intake stroke injection may be leaner than stoichiometry and the injection during compression may be richer than stoichiometry to make air fuel ratio locally near the plug richer than the overall mixture for the purpose of making combustion easier.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. The fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may enhance mixing and combustion when operating the engine with an alcohol-based fuel due to the lower volatility of some alcohol-based fuels. Alternatively, the injector may be located overhead and near the intake valve to enhance mixing. Fuel may be delivered to fuel injector 166 from a fuel tank of fuel system 8 via a high-pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel into the intake port upstream of cylinder 14. Fuel injector 170 may inject fuel, received from fuel system 8, in proportion to the pulse width of signal FPW-2 received from controller 12 via electronic driver 171. Fuel injector 170 may be referred to as a port fuel injector (PFI). Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors (DI) for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it may be appreciated that the fuel systems described herein may not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as pre/post-delivery condition, engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof. In one example, when the engine is in pre-delivery state, the fueling strategy may be adjusted based on whether the engine system includes DI-only or DI-PFI as shown in FIG. 2A. In engines with dual fueling capabilities (e.g., DI and PFI present), during pre-delivery, the engine may fueled using PFI, while DI may be intermittently enabled to allow air in the fuel rail to be purged into the combustion chamber (FIG. 2A). In DI-only systems, all the fuel to the engine may be delivered using a first DI fueling strategy including a single intake DI on at least the first combustion event, to reduce spark plug fouling, as explained with reference to FIG. 2B. Herein, all the fuel is delivered at an earlier time during the intake stroke on the first combustion event to maximize mixing of air and fuel, thereby reducing the amount of fuel present near the spark plug. In comparison, when the engine is in a post-delivery state, the fuel may be delivered using a second, different direct injection fueling strategy including split direct injection on the first combustion event (see FIG. 2B). For example, when the engine is the post-delivery state, the DI fuel may be split to include a first, intake stroke direct injection and a second, compression stroke direct injection.

Direct injection of at least some of the fuel to the engine during the compression stroke includes adjusting a split direct injection (DI) ratio of the fuel injector to deliver a defined ratio of the fuel during the intake stroke and the remaining fuel during the compression stroke. As such, the relative distribution of the total injected fuel between the intake stroke (direct) injection and the compression stroke (direct) injection may be referred to as a split DI ratio. For example, injecting a larger amount of the direct injected fuel for a combustion event during an intake stroke may be an example of a higher split DI ratio, while injecting a larger amount of the fuel for a combustion event during a compression stroke may be an example of a lower split DI ratio. As such, the split DI may be used with DI-only and DI/PFI systems. For example, the split direct injection may be employed during post-delivery in DI/PFI systems if the split injection results in faster catalyst heating while meeting other emissions requirements for soot. As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day-to-day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus.

Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature determined from temperature sensor 116. As one example, during an engine start, the controller may receive input regarding engine temperature and send a signal to the direct fuel injector to adjust a fuel pulse width and a fuel injection timing to deliver fuel according to the first or the second fueling strategy.

As one example, the controller may monitor the number of engine starts, based on key-on events, for example. In one example, if the number of engine starts is lower than a threshold number, the controller may determine that the engine is in a pre-delivery state and accordingly engage a first fueling strategy including a single intake stroke direct injection. In another example, if the number of miles (e.g., total miles driven in a given trip/drive cycle, or total miles driven since the vehicle's assembly in the plant) is below a threshold, the controller may determine that the engine is still in the pre-delivery state. When the number of engine starts is higher than the threshold number, the controller may infer that the engine is in a post-delivery state and accordingly employ a second fueling strategy, which includes a single intake stroke direct injection and a second compression stroke direct injection. In some embodiments, the vehicle dealer (or a service technician) may deactivate the pre-delivery strategy by operating a sequence of actuators, or by running a diagnostic feature and executing software to shut off the pre-delivery mode. As another example, the controller may be able to infer a spark plug temperature based on the output of the temperature sensor 116. If the inferred spark plug temperature is higher than a threshold temperature, the controller may be able to transition from a first fueling strategy including single intake stoke injection to a second fueling strategy including a split direct injection in the intake and compression stroke. As yet another example, the controller may receive a signal from the Hall Effect sensor 120 to determine the position of the crankshaft and the camshaft. By monitoring the position of the crankshaft, the controller may be able to determine the combustion event number, for example. As such, based on the total number of combustion events of engine ever since the first start (or green start) of the engine, the controller may adjust fueling strategies. For example, in engines with dual fueling capabilities (e.g., DI and PFI present), during pre-delivery, the engine may be fueled using (only) PFI initially, while DI may be intermittently enabled to allow air in the fuel rail to be purged into the combustion chamber. The controller may additionally adjust each of the pulse width of signals FPW-1 and FPW-2 to adjust a ratio of fuel injected via the port fuel injector and the direct fuel injectors. In DI-only systems, based on the total number of combustion events of engine ever since the first start (or green start) of the engine, the controller may transition operating the DI-only engine with single intake stroke direct injection to direct injecting at least some of the fuel in the compression stroke.

In this way, the components of FIG. 1 enable a system, comprising an engine including a cylinder, a direct injector, and a controller with computer-readable instructions stored on non-transitory memory for: for a first engine start of the vehicle following vehicle assembly, operating the engine with a single intake stroke direct injection, and operating the engine with a split ratio of fuel direct injected during an intake stroke relative to fuel direct injection during a compression stroke after a threshold number of engine starts have elapsed. Additionally or alternatively, each of an average timing of the injecting fuel from the direct injector and the split ratio may be adjusted based on a number of combustion events since the first engine start. Additionally or alternatively, the controller includes further instructions for retarding the average timing of the injecting fuel from the direct injector after a number of engine starts since the first engine start reaches the threshold number. Additionally or alternatively, the controller includes further instructions for increasing the split ratio after the number of engine starts reaches the threshold number.

FIG. 2A provides an example method 200 for determining a fueling strategy of an engine (such as engine 10 shown in FIG. 1) of a vehicle, according to the present disclosure. A fueling strategy may be adjusted via the method 200 based on whether the engine includes single or dual fueling capabilities. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

A newly manufactured vehicle is determined to be in pre-delivery state while the vehicle is still at an assembly plant, and before it is delivered to the customer. A vehicle controller may activate a pre-delivery status of the vehicle responsive to the vehicle being in the pre-delivery state. In some examples, the pre-delivery status may be a default setting of a newly assembled engine that is disabled following vehicle departure from the assembly plant. In other examples, an operator of the vehicle may activate the pre-delivery status (or state) when the vehicle is operated for the first time after assembly at an end of line station in the assembly plant. When the pre-delivery status expires and/or is deactivated, the vehicle may transition from the pre-delivery state to a post-delivery state (or a post-delivery status may become active). Method 200 is performed by a controller to determine if the vehicle is in pre-delivery or post-delivery state, and additionally adjust engine fueling based on fueling capabilities (e.g., single or dual).

Method 200 begins at 202 where it is determined if a threshold number of engine starts has elapsed. For example, an engine start may be requested at one or more different stations of the assembly plant and it may be determined if the current engine start is within a threshold number of engine starts since a very first engine start of the vehicle since an initial assembly of the vehicle. As such, the number of engine starts may be determined based on the number of times that the starter motor is actuated, for example. In one example, the controller may determine if the currently commanded engine start at the assembly plant is a very first engine start since the initial assembly of the vehicle with no previous engine starts having occurred. That is, it may be determined if a first ever combustion event of the engine has been commanded with no prior combustion events having been commanded or completed in the engine since the assembly of the engine system. In such an example, the threshold number of engine starts may be set to two, if the number of engine starts performed on the engine at the assembly plant is lower than two, then the controller may determine that the current engine start is the first ever start of the engine, and start engine fueling using a pre-delivery calibration. Herein, the engine may a green engine, and the first ever start performed on the green engine may be referred to as a green start. In another example, the threshold number of engine starts may be set to an alternate number. If the total number of engine starts performed on the engine since the first ever engine start is less than the alternate number while the vehicle is still in the assembly plant, then the controller may determine that the vehicle is in pre-delivery state (or green start condition), and accordingly start fueling the engine with the pre-delivery calibration. In one example, the alternate number may be a default number of starts set by the manufacturer taking into account the type and model of the vehicle. In another example, the alternate number may be input by an operator of the vehicle.

If the engine has completed the threshold number of starts (e.g., "YES" at 202), then the engine is said to be in a post-delivery state, and method 200 proceeds to 214 where engine fueling is adjusted using a post-delivery calibration, which will be described in detail later.

If the threshold number of starts has not elapsed (e.g., "NO" at 202), then method 200 proceeds to 204 to select an appropriate fueling strategy for the engine. In one example, the completion of the pre-delivery phase may be determined based upon one or more of the mileage of the vehicle achieving the predetermined mileage threshold (as checked at 204), deactivation of the pre-delivery status or calibration (as checked at 206), the fuel level in the fuel tank falling below a threshold amount, the number of combustion events reaching the threshold number of events, a spark plug tip reaching a threshold temperature, and the like.

At 204, method 200 includes determining if a threshold number of miles have been driven. The controller may record and update mileage information of the vehicle since assembly of the vehicle. In another example, the controller may check if the integrated miles (e.g., sum total of miles) driven during a single trip/vehicle drive cycle is higher than a threshold. As such, the single trip may occur between an engine start and the next successive engine stop, with no other engine starts/stop there between. Alternatively, it may be determined if the integrated miles driven over multiple drive cycles since the assembly of the vehicle at the plant has exceeded the threshold number of miles. If the threshold number of miles has not been driven or if the integrated miles during the single trip is below the threshold (e.g., "NO" at 204), then method 200 proceeds to 206 for additional pre-delivery status checking. However, if the threshold number of miles has been driven or the integrated miles during the single trip is higher than the threshold (e.g., "YES" at 204), then method 200 proceeds to 214 where the controller may adjust engine fueling using a post-delivery calibration.

At 206, method 200 includes checking if the pre-delivery status has been exited. In some examples, a service technician may deactivate the pre-delivery calibration by operating a plurality of actuators in a pre-defined sequence, or by running a diagnostic feature and executing software to shut off the pre-delivery calibration. If the pre-delivery status is still active (e.g., "NO" at 206), then method 200 proceeds to 208. However, if the pre-delivery status in no longer active (e.g., "YES" at 206), then method 200 proceeds to 214.

At 208, method 200 includes checking if PFI hardware is present. As such, engine systems may be configured with single or dual fueling capabilities. In engines where only DI fueling capabilities are present (e.g., "NO" at 208), the engine is determined to be configured with single fueling capabilities. Accordingly, method 200 proceeds to 210, where the controller may employ a first fueling strategy to deliver fuel to the engine, the first fueling strategy including starting the engine using a single intake stroke direct injection, as explained in detail with reference to FIG. 2B. Method 200 then exits.

If PFI hardware is present (e.g., "YES" at 208), then method 200 proceeds to 212. When both PFI and DI injectors are present, the engine is determined to be configured with dual fueling capabilities. The presence of the PFI hardware may be detected based on the presence of a PFI electronic driver (e.g., driver 171 of FIG. 1). If PFI hardware is present (e.g., "YES" at 208), then method 200 proceeds to 212, where the controller may activate the PFI while intermittently activating DI, as required. For example, the controller may activate PFI and temporarily deactivate DI, and reactivate the DI intermittently to reduce the DI injector from getting soot fouled. If minimum enabling conditions for temperature and time have been exceeded, then periodic DI may be performed to keep the system clean. For example, the controller may activate DI intermittently during PFI injection (e.g., every fifth or tenth fuel injection may be injected via the DI injector) to keep the DI injector tip clean. The controller may also activate DI intermittently during the pre-delivery state to cool the DI injector. In another example, the DI may be activated during pre-delivery to allow air in the fuel rail to be purged into the combustion chamber. In yet another example, DI may be activated if the controller determines that the DI pump has been shut down for a significant period of time. In still other examples, when the engine temperature (as inferred from a coolant temperature, measured by a temperature sensor such as sensor 116 of FIG. 1, for example) is greater than a threshold temperature, the controller may activate DI. Method 200 then ends.

Returning to 202, if the threshold number of starts has elapsed (e.g., "YES" at 202), then method 200 proceeds to 214 where the controller adjusts engine fueling using a post-delivery calibration. As such, the controller may arrive at 214 when other conditions are satisfied (e.g., threshold miles, pre-delivery exited). For example, at 204, if the threshold number of miles have been driven by the vehicle (e.g., "YES" at 204), then method 200 also proceeds to 214. Likewise, if the pre-delivery status is exited (e.g., "YES" at 206), then method 200 proceeds to 214.

In one example, the post-delivery calibration may become active and operative only after deactivation of the pre-delivery calibration. Further, the vehicle may be considered to be in the post-delivery phase only after completion of the pre-delivery phase. In some examples, a pre-delivery state may be activated in the newly manufactured vehicle following production and assembly of the vehicle when in the pre-delivery phase, and the post-delivery state may be automatically activated after a predefined time or distance of vehicle operation has elapsed.

At 214, the controller may adjust the engine fueling strategy using a post-delivery calibration. For an engine with dual fueling capabilities, adjusting fueling using post-delivery calibration may include injecting fuel via PFI only; however, when engine temperature exceeds a certain threshold, the controller may temporarily transition from PFI to DI injection. It may be appreciated that while injecting via PFI, the controller may intermittently activate DI to also avoid injector deposits.

For example, in a PFI/DI system, adjusting fueling using post-delivery calibration may include delivering some fuel via port injection and enabling the previously disabled direct injector. In one example, if an engine temperature is higher than a threshold temperature, the controller may transition from PFI to split PFI/DI. In another example, if the spark plug temperature is higher than a spark plug threshold temperature, the controller may transition from PFI to split PFI/DI. In yet another example, if the combustion event number exceeds a number of combustion events since the first combustion event of the engine start, the controller may transition from PFI injection to split PFI/DI injection.

The controller may additionally adjust the pulse width of signals commanded to the port and direct fuel injectors to adjust the split PF/DI ratio of fuel injected via the port fuel injector and the direct fuel injectors. Herein, the PFI/DI split ratio may be defined as the amount of fuel injected using a port fuel injector (PFI) to the amount of fuel injected using a direct injector (DI). For example, injecting a larger amount of fuel for a combustion event via port injector compared to amount of fuel injected via direct injector may result in a higher PFI/DI split ratio. Herein, the fuel may be injected via the port injector during an exhaust stroke of a previous engine cycle. During the exhaust stroke, the intake valve may be closed, thus giving the injected fuel enough time to mix with air, before entering the chamber through the open intake valve during the intake stroke.

However, in DI only systems, adjusting fueling using post-delivery calibration may include injecting a portion of the fuel during the compression stroke as explained with reference to FIG. 2B. As such, compression injection may be used during catalyst light-off mode to help maintain combustion stability with an overall leaner than stoichiometry operation. Method 200 then ends.

Figure 2B:
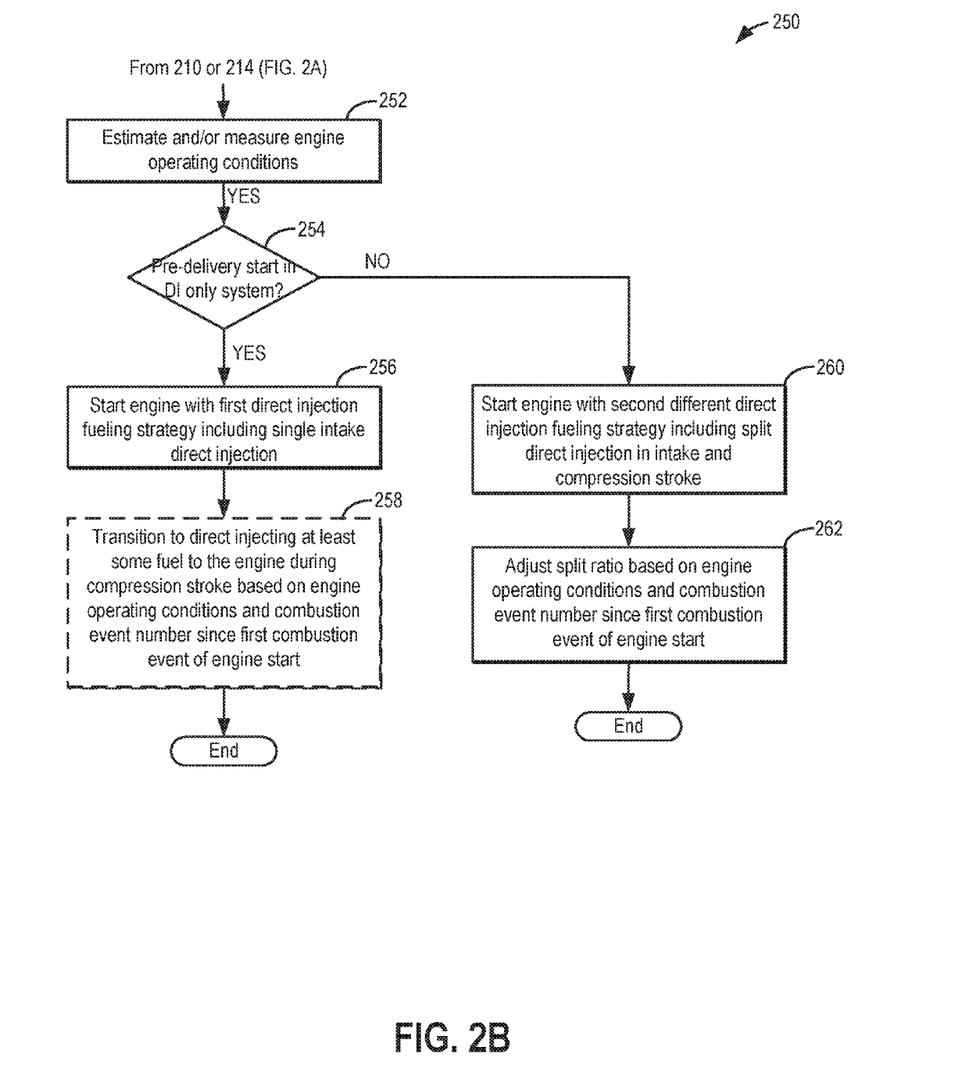
FIG. 2B depicts a flow chart of a method for operating a DI engine with distinct fuel injection strategies during pre-delivery and post-delivery states, according to the present disclosure.

Turning now to FIG. 2B, it provides an example method 250 for determining a fueling strategy of a DI only engine of a vehicle, according to the present disclosure. A fueling strategy may be adjusted via the method 250 based on whether the DI engine is in a pre-delivery or post-delivery state, and further based on engine operating conditions such as engine temperature, combustion event number since an engine start, etc. Instructions for carrying out method 250 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 250 begins at 252, which includes estimating and/or measuring engine operating conditions. Engine operating conditions may include engine speed, engine temperature, combustion events, ambient conditions (ambient temperature, pressure, humidity, etc.), torque demand, manifold pressure, manifold air flow, canister load, exhaust catalyst conditions, oil temperature, oil pressure, soak time, a mounting position of a fuel pipe of the fuel system (to infer fuel temperature), spark plug temperature, and the like. In some examples, method 250 may include the controller estimating and/or measuring vehicle and engine operating conditions. Herein, estimating engine operating conditions may include receiving signals from a plurality of sensors, such as the sensors shown in at FIG. 1, and processing these signals in an appropriate manner at the engine controller.

Method 250 proceeds to 254 where the controller determines if the DI-only engine is in pre-delivery state. As previously described with reference to FIG. 2A, the controller may determine if the DI-only engine is in the pre-delivery state based upon one or more of activation of the pre-delivery calibration, mileage of the vehicle being lower than a predetermined mileage threshold, fuel consumed by the vehicle being below a threshold amount, number of combustion events being below a threshold number of events, and the spark plug temperature below a threshold temperature.

If the controller determines that the DI-only engine is in the pre-delivery state (e.g., "YES" at 254), then method 250 proceeds to 256. At 256, method 250 includes starting the engine with a first direct injection fueling strategy including a single intake stroke direct injection. As described previously with reference to FIG. 2A, starting the engine with the first direct injection fueling strategy may include activating a direct injector (such as fuel injector 166) of the engine. Briefly, the controller may deliver a pulse width signal to an electronic driver (such as electronic driver 168 of FIG. 1) to start the engine by delivering all the fuel to the engine via only the direct fuel injector during an intake stroke of the engine cycle. Herein, all the fuel on a first combustion event of the engine start is directly injected into a combustion cylinder (such as combustion cylinder 14 of FIG. 1) using a single intake stroke injection. As such, the intake stroke occurs when a piston (such as piston 138 of FIG. 1) moves from top dead center (TDC) to bottom dead center (BDC) and an intake valve (such as intake valve 150 of FIG. 1) is open. Thus, during a first ever combustion event of the engine, the engine may be fueled using the default first fueling strategy that includes a single intake stroke direct injection of the fuel. Additionally, the controller may adjust an injection timing of the fuel directly injected during the intake stroke. In one example, the controller may adjust the injection timing of the directly injected fuel such that the fuel is directly injected immediately after the intake valve opens (e.g., when the piston is closer to TDC). The technical effect of operating the engine with a single intake stroke injection and advancing the timing of the single intake direct injection is that fuel may be delivered earlier, thus, enabling the air and fuel to be mixed thoroughly during the intake stroke. Because of the thorough mixing of air and fuel, the amount of residual fuel present near the spark plug may be reduced. This in turn may reduce fouling of the spark plug of a newly assembled vehicle during the green start of the engine. Method 250 then optionally proceeds to 258.

At 258, method 250 may include transitioning to direct injecting at least some fuel to the engine during compression stroke based on engine operating conditions and combustion event number since first combustion event of engine start. Engine operating conditions may include engine temperature and spark plug temperature. For example, the controller may determine an engine temperature based on an engine coolant temperature determined from a temperature sensor. Once the engine temperature of the vehicle rises above a first threshold temperature (e.g., above the light-off temperature of an exhaust catalyst) during the first engine start at the assembly plant (e.g., in the first ever start of the engine, or during subsequent starts at different stations along the assembly line conveyor), the controller may transition the engine from single intake stroke direct injection to direct injecting at least some of the fuel in the compression stroke. In this way, by discontinuing intake direct injection after the engine temperature reaches the threshold, cold-start particulate matter emissions may be reduced.

In another example, once the temperature of a spark plug in the chamber rises above a first spark plug threshold temperature (e.g., 500° C.) during the engine start at the assembly plant, the controller may transition from operating the engine with single intake stroke direct injection to direct injecting at least some of the fuel in the compression stroke. Based on the output of a temperature sensor positioned within a combustion chamber, the controller may infer a spark plug temperature, for example. The spark plug temperature may alternatively be inferred based on an ionization current at the spark plug during the intake stroke and/or based on an inferred spark plug tip temperature (which in turn is determined as a function of engine speed and load, and duration of engine operation at a given engine speed-load region). As such, combustion of fuel within the combustion chamber may produce ionization at the spark plug. By measuring the ionization current responsive to a voltage applied across the spark plug (e.g., ion sensing), the ionization of the spark plug may be determined, and the spark plug temperature may be inferred. In yet another example, the spark plug temperature may be directly measured from a thermocouple embedded in a surface of the spark plug. If the spark plug temperature is greater than the first spark plug threshold temperature, the controller may transition from single intake stroke direct injection to direct injecting at least some of the fuel in the compression stroke.

In yet another example, the controller may transition the engine from single intake stroke direct injection to direct injecting at least some of the fuel in the compression stroke based on a combustion event number of the engine as counted since the first combustion event of the engine start.

Direct injection of at least some of the fuel to the engine during the compression stroke includes adjusting a split direct injection (DI) ratio of the fuel injector to deliver a defined ratio of the fuel during the intake stroke and the remaining fuel during the compression stroke. As such, the relative distribution of the total injected fuel between the intake stroke (direct) injection and the compression stroke (direct) injection may be referred to as a split DI ratio. For example, injecting a larger amount of the direct injected fuel for a combustion event during an intake stroke may be an example of a higher split DI ratio, while injecting a larger amount of the fuel for a combustion event during a compression stroke may be an example of a lower split DI ratio.

In one example, the controller may decrease the split DI ratio so that more fuel is delivered during the compression stroke than during the intake stoke. The controller may adjust the pulse width of the direct fuel injector to change the quantity of fuel delivered to the cylinder in each of the intake stroke and the compression stroke. The pulse width during the compression stroke may be larger than the pulse width for the intake stroke, thereby ensuring that more fuel is injected during the compression stroke than during the intake stroke. As an example, the split DI ratio may be set to 0.7, whereby 70% of the fuel may be delivered during the intake stroke and the remaining 30% of the fuel may be delivered during the compression stroke. In addition, the injection timing of the intake stroke direct injection may be retarded compared to the single direct stroke injection that was used to start the engine at 256. Thus, the average injection timing may be closer to the start of the compression stroke (e.g., piston at BDC) than to the start of the intake stroke (e.g., piston at TDC).

The split DI ratio may be further adjusted based on fuel alcohol content. As an example, the split DI ratio may be decreased as the alcohol content of the fuel increases, with a larger portion of fuel delivered in the compression stroke as the fuel alcohol content increases. In addition, an air/fuel ratio of the combustion event may be adjusted. For example, the air/fuel ratio may be adjusted to be leaner than stoichiometry in the intake stroke, while the air/fuel ratio may be adjusted to be richer than stoichiometry in the compression stroke while maintaining an overall stoichiometry air/fuel ratio of combustion for the combustion event. As such, leaner DI injection during intake stroke and richer DI injection during compression stroke may ensure that the air/fuel ratio locally near the spark plug is richer than the overall mixture, making combustion easier. Method 250 ends.

If the controller determines that the DI only engine is post-delivery state (e.g., "NO" at 254), method 250 proceeds to 260 where the controller applies a second, different fueling strategy/calibration for starting an engine in the post-delivery state. In one example, the post-delivery state calibration may become active and operative only after deactivation of the pre-delivery calibration. Further, the vehicle may be considered to be in the post-delivery phase only after completion of the pre-delivery phase. The completion of the pre-delivery phase may be determined based upon one or more of deactivation of the pre-delivery calibration, the mileage of the vehicle achieving the predetermined mileage threshold, the fuel consumed by the vehicle attaining a threshold amount, the number of combustion events reaching the threshold number of events, spark plug reaching a threshold temperature, and the like. In some examples, a pre-delivery state may be activated in the newly manufactured vehicle following production and assembly of the vehicle when in the pre-delivery phase, and the post-delivery state may be automatically activated after a certain time or distance of vehicle operation has elapsed.

In one example, the controller may apply the second fueling strategy using the split ratio of compression injection until a catalyst light off is reached. As such, the second fueling strategy may be distinct from the first fueling strategy as explained below. Operating the engine in the second fueling strategy by split direct injection may further include operating the engine with a first intake stroke injection followed by a second compression stroke injection. Unlike the first fueling strategy where all the fuel was delivered in the intake stroke, the second fueling strategy includes splitting the fuel delivered to the combustion chamber. As described previously at 256, the split DI ratio of the injections is defined as a ratio between an amount of fuel injected in the first intake stroke and an amount of fuel injected in the second compression stroke. The split DI ratio may be a higher value when more fuel is injected in the intake stroke than during the compression stoke. The split DI ratio may be a lower value when more fuel is injected during the compression stroke than during intake stroke of the cylinder. Additionally, an injection timing of the first intake stroke injection is later than an injection timing of the single intake stroke injection that is used on the first fueling strategy. For example, the first intake stroke injection may be retarded (e.g., 20-100 degrees of crank angle) depending on how much fuel is injected in the compression stroke.

Next at 262, method 250 includes adjusting the split DI ratio of the fuel delivered in the first intake stroke relative to the second compression stroke based on each of a combustion event number since the start of the engine and the engine temperature. For example, as the number of combustion events increases, the controller may adjust the split fuel injection ratio so that more fuel is delivered during the compression stroke than during the intake stoke. This may be achieved by decreasing the split DI ratio, for example. Based on the split DI ratio, the controller may adjust a fuel injection pulse to change the quantity of fuel delivered to the cylinder. Herein, the pulse width for the direct fuel injector may be changed to effect a change in the split DI ratio. As such, the split DI ratio may be adjusted differently at 260 when compared to the adjustments made to the split DI ratio at 258 when the vehicle is still in pre-delivery calibration. As such, the split for the pre-delivery state may be used to minimize soot formation to avoid spark fouling while the split injection in the post-delivery state may be used to warm-up the catalyst at the lowest level of unburned hybrodcarbons, NOx, and soot emissions. In both cases, the compression stroke injection may be kept at a minimum value to enhance combustion stability while not causing excessive emissions.

In some examples, the split DI ratio may be further adjusted based on fuel alcohol content. Herein, the split fuel injection ratio may be decreased as the alcohol content of the fuel increases. While the split fuel injection ratio is decreased, the injections may be adjusted so that a start of injection timing in the intake stroke and an end of injection timing in the compression stroke is maintained, even as the alcohol content of the fuel changes, the split ratio changes, and the total amount of fuel injection changes. Method 250 then ends.

In this way, the engine may be started with a first fueling strategy including an intake stroke direct injection when the DI only engine is first started in the assembly plant. This ensures that the fuel mixes thoroughly with air in the chamber, and minimizes spark plug fouling in newly assembled vehicles.

In this way, an engine fueling strategy for a first combustion event (or a first number of combustion events) of an engine start may be adjusted based on whether the engine is in the pre- or post-delivery state, and further based on whether the engine is equipped with single or dual fuel injection capabilities. By using different fueling strategies during the different states, spark plug fouling may be minimized. For example, by using single intake stoke direct injection during pre-delivery in a DI only engine, air and fuel may be mixed more thoroughly, therefore the amount of residual fuel present near the spark plug may be reduced. As another example, in PFDI engines, fuel may be delivered using PFI when the vehicle is in a pre-delivery state while DI is intermittently activated during the pre-delivery state to clean the injector tip, or cool the direct injector. As a result, spark plug fouling may be reduced, improving engine component life and reducing low mileage warranty issues.

An example method for an engine comprises operating an engine with a first direct injection fueling strategy including single intake direct injection on an engine start when in a pre-delivery state; and operating the engine with a second, different direct injection fueling strategy including split direct injection on the engine start when in a post-delivery state. Additionally or alternatively, the single intake direct injection may include a single intake stroke injection while the split direct injection may include at least a first, intake stroke injection and a second, compression stroke injection, and wherein an injection timing of the single intake stroke injection is earlier than the injection timing of the first intake stroke injection. Additionally or alternatively, a ratio of fuel delivered in the first intake stroke injection relative to the second compression stroke injection may be adjusted based on each of combustion event number since the engine start, and engine temperature. Additionally or alternatively, the ratio of fuel delivered in the compression stroke may be increased as the combustion event number increases and as the engine temperature increases. Additionally or alternatively, the ratio may be further adjusted based on fuel alcohol content. Additionally or alternatively, the method may further include during the post-delivery state, maintaining operation of the engine with the first strategy for a threshold number of combustion events since the engine start in the pre-delivery state, and after the threshold number of combustion events have elapsed, transitioning to injecting at least some fuel to the engine during a compression stroke. Additionally or alternatively, the engine may be configured for direct injection only. Additionally or alternatively, the method may include maintaining operation of the engine with the first strategy until an inferred spark plug temperature is higher than a threshold temperature, and then transitioning to the second fueling strategy. Additionally or alternatively, the engine start when in the pre-delivery state is a first green engine start, the method may include continuing operation of the engine with the first strategy until one or more of an integrated value based on a number of green start events since the first green start and a duration of each of the number of green start events is higher than a threshold value, a number of miles since the first green start is higher than a threshold mileage, and the pre-delivery state is deactivated.

Figure 3:
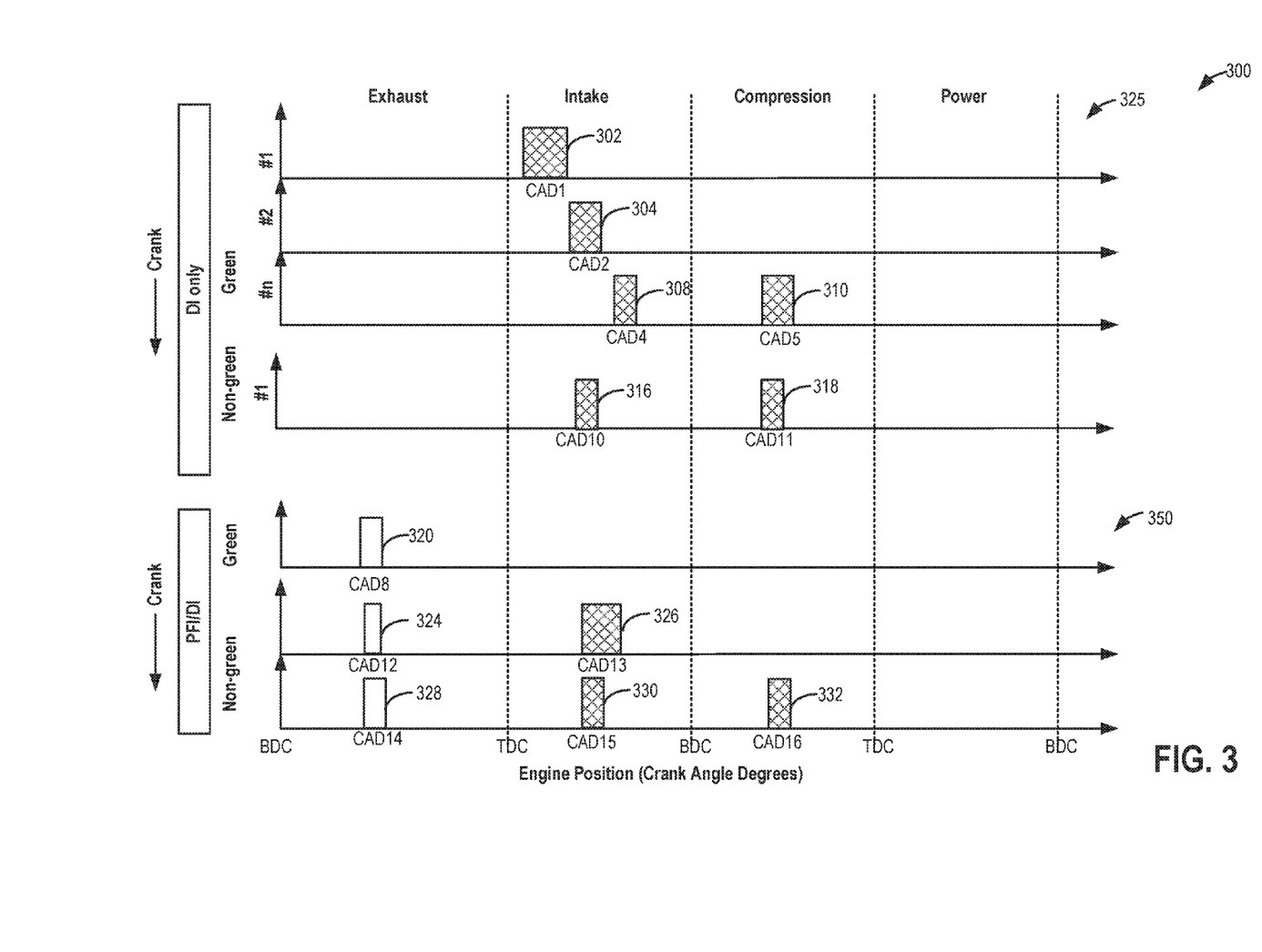
FIG. 3 shows example fuel injection profiles used during a green start and subsequent start conditions of the engine, according to the present disclosure.

Turning now to FIG. 3, map 300 illustrates example fuel injection profiles during an engine start for a green engine and non-green engine. During an engine start, while the engine is being cranked, an engine controller may be configured to adjust a fuel injection profile of fuel delivered to the cylinder. In particular, fuel may be delivered via one or more direct fuel injectors and port injectors based on whether the engine is equipped with single or dual fuel injection capabilities, and whether the engine is in pre- (green) or post-delivery (non-green) state, and further based on engine operating conditions.

Adjustments to a split DI ratio and a timing of direct injection when a DI only engine is in a green start condition, and when the vehicle is in a non-green condition is shown in map 325. Adjustments to a PFI/DI split ratio and a timing of direct injection in a PFI/DI engine when the engine is in a green start condition and when the vehicle is in non-green condition is shown in map 350. Map 300 illustrates an engine position along the x-axis in crank angle degrees (CAD). Different fuel injection profiles (302 through 318) may be employed by a controller during different strokes in the engine cycle based on whether the DI only engine is in green or non-green condition. Likewise, different fuel injection profiles (320 through 332) may be employed by a controller during different strokes in the engine cycle based on whether the PFI/DI engine is in a green or a non-green condition. As such, each injection profile depicts a timing of injection relative to a cylinder piston position. Based on the position of the cylinder's piston at any time in the engine cycle, fuel may be injected into the cylinder during an intake stroke (I), a compression stroke (C), a power stroke (P), or an exhaust stroke (E). The injection profile further depicts whether fuel was injected via port injection (solid white blocks), single or multiple direct injections (striped blocks), or both. Further, a width of the injection profile indicates a relative amount of fuel delivered to the chamber. The numbers on the Y-axis indicate the combustion event number. For example, number 1 indicates the first combustion event of a first ever engine start since assembly of the vehicle, which is also referred to herein as a green start. In some examples, the engine may be considered to be in the green condition for a threshold number of engine starts while the vehicle is still in the assembly plant. Herein, the fuel injection profile during the first combustion event of the first ever engine start of the DI-only engine is indicated by plot 302. Successive engine starts of the DI-only engine in a green condition have a fuel injection profile indicated by plots 304 through 310. Likewise, a set of engine starts in the non-green condition (e.g., when the vehicle has left the assembly line and has been delivered to the dealership or to a customer) are indicated at plots 316 and 318.

The fuel injection profile during the first combustion event of the first ever engine start of the PFI/DI engine is indicated by plot 320. Successive engine starts of the PFI/DI engine in non-green condition (e.g., when the vehicle has left the assembly line and delivered to the dealership/customer) have a fuel injection profile indicated by plots 324 through 332.

As explained previously, a vehicle may be in the assembly plant during assembly of the vehicle and/or assembly of vehicle sub-systems (e.g., fuel system, engine system, etc.), as well as immediately after assembly while vehicle components and sub-systems are being checked. As such, it may be confirmed that the vehicle is still in the assembly plant if the vehicle has not yet left the plant and been delivered to a customer/vehicle operator. For DI only engines, during the first ever engine start, the engine may be started by injecting fuel from a direct injector with a single intake stroke direct injection only (plot 302). All the fuel is delivered in the intake stroke as a single direct injection. Additionally, a timing of intake stroke direct injection may be advanced such that the single direct injection occurs soon after the completion of the exhaust stroke, and at the beginning of the intake stroke. Thus, all of the fuel may be directly injected during the intake stroke, and fuel may not be injected during the compression stroke during the first combustion event of the first ever engine start. Typically, direct injection is a relatively late fuel injection, and there may not be sufficient time for mixing of the injected fuel and air in the cylinder. Consequently, there may be pockets of rich fuel that may foul the spark plug. The inventors have recognized that by advancing the timing of the intake, direct injection and additionally delivering all the fuel in the intake stroke when the engine is in pre-delivery state, the fuel may have sufficient time to mix with the air inside the chamber. As a result, a more uniform mixture may be present in the chamber, which then burns more efficiently in the successive engine cycles.

After the engine is started for the very first time using the single intake stroke direct injection profile (plot 302), the controller may continue using the same injection profile for a threshold number of combustion events. As an example, the single intake stroke injection may be continued for tens or hundreds of combustion events. In this way, the DI only engine may be fueled using a single intake stroke direct injection to reduce spark plug fouling.

In another example, the controller may continue direct intake stroke only injection for the very next combustion event (e.g., combustion event #2). However, the average timing of direct injection during the intake stroke (plot 304) may be retarded compared to the average timing of injection during the intake stroke during the first ever start of the engine (plot 302). In one example, during the second combustion event of the engine, the average timing of intake injection may be at the middle of the intake stroke cycle, which may be more retarded when compared to the intake stroke injection timing of the first engine start (plot 302). Thus, CAD 2 may be more retarded relative to CAD 1. In one example, the intake stroke injection may be leaner than stoichiometry, and the compression stroke injection may be richer than stoichiometry. As a result, rich combustion conditions at the spark plug during green start conditions may be reduced leading to fewer deposits on the spark plug.

For the $n^{th}$ combustion event (n number of combustion events after the first ever combustion event on the first ever engine start at the assembly plant), the engine may be transitioned to fuel delivery using a spilt fuel injection profile. Herein, fuel injected using direct fuel injectors may be split across two different strokes of the engine cycle. A portion of the total fuel may be direct injected during the intake stroke (plot 308) and a remaining portion of the fuel may be direct injected during the compression stroke (plot 310). As such, a ratio of the amount of fuel injected during the intake stroke to the amount of fuel injected during the compression stroke may constitute a split DI ratio. In one example, 15% of the fuel injection may be delivered as an intake stroke direct injection while a remaining 85% of the fuel injection is delivered as a compression stroke direct injection.

Once the number of combustion events since the first engine start increases reaches the threshold number n, the engine may be transitioned to a fueling strategy using a split direct injection profile, where a smaller amount of fuel may be injected in the intake stroke relative to the compression stroke, thus decreasing the split DI ratio. The amount of fuel injected in the intake stroke may be decreased while correspondingly increasing the amount of fuel injected in the compression stroke. In addition, the average timing of direct injection during the intake stroke (plot 308) may be retarded compared to the average timing of injection during the intake stroke during the first combustion event of the engine (plot 302), and the second combustion event (plot 304). In one example, during the $n^{th}$ combustion event of the engine, the average timing of intake injection may be closer to the end of the intake cycle, and closer to the start of the compression cycle. Herein, the intake stroke injection (plot 308) may be retarded relative to the single intake stroke injection (plot 302). Thus, CAD 4 may be more retarded compared to CAD 1 (as well as CAD 2). Thus, intake direct injection (plot 308) may occur when the piston is closer to the bottom dead center. In one example, the direct injected fuel in the intake stroke (plots 304 and 308) may be adjusted to a leaner ratio than stoichiometry ratio, and the direct injected fuel in the compression stroke (plots 306 and 310) may be adjusted to a richer ratio than stoichiometry. By using leaner than stoichiometric air/fuel ratio, rich combustion conditions during green start conditions may be reduced leading to fewer deposits on the spark plug.

In some examples, during the engine cranking, fuel injection may be transitioned to a profile where fuel is direct injected as multiple injection only in the compression stroke (not shown in map 300). The injection amounts may be adjusted such that equal amounts of fuel may be delivered in each of the compression stroke direct injections. In one example, none of the fuel injection may be delivered as an intake stroke injection during cranking while 50% of the fuel is injected during the first compression direct injection and another 50% of the fuel injection may be delivered during the second compression stroke direct injection. By splitting the direct injection so that some of the direct injected fuel is injected during the intake stroke and the remaining part of the direct injected fuel is injected during the compression stroke, the catalyst light-off temperature can be attained without raising exhaust particulate matter (PM) emissions and degrading engine combustion stability. Overall, engine performance is enhanced, exhaust emissions are enhanced, and fuel economy is improved.

In this way, the engine may be fueled using the first fueling strategy having a single intake stroke injection during the first series of combustion events for the engine at the assembly line. In the subsequent combustion events, based on engine operating conditions such as engine temperature, spark plug temperature, combustion event number and the like, the controller may switch from intake only direct injection to one of split DI in intake and compression stroke.

In one example, the first fueling strategy with single intake stoke direct injection may be performed for the very first start of a newly manufactured engine. In another example, the first fueling strategy may be performed at every start of the engine while the engine is still at the assembly plant. As described previously, the engine is typically started at different stations along an assembly line for performing various factory-specific testing on the engine. Typically, the engine may be turned on at a station, run for a certain time while testing at the station, and then turned off and moved to another station on the assembly line conveyor for additional testing. In certain cases, the engine may again be started at the next station. If the engine shut down at the previous station and the engine restart at the next station happens within a threshold time (or the engine temperature is above a threshold temperature at the start up at the next station), the engine may not be started at the next station using the first fueling strategy. Instead, the engine may be started using the second strategy which includes a split DI injection in intake and compression stroke as shown in plots 304 through 314, and then transitioned to split DI injection (plots 316 and 318) when the engine is in non-green condition, as described below.

Once the engine is in post-delivery state (e.g., non-green), the engine may be started using a second fueling strategy including a split DI injection in the intake stroke (plot 316) and the compression stroke (plot 318). In one example, the split DI ratio during a non-green start may be adjusted based on engine operating conditions, such as engine temperature, spark plug temperature, and so on. The split DI ratio may be adjusted differently as compared to the pre-delivery state. In one example, the split DI ratio may be set to 1, indicating that the same amount of fuel is delivered in each of the intake stroke and compression stroke. As such, the timing of the intake stroke direct injection (plot 316) may be retarded compared to the timing of the single intake stroke direct injection in pre-delivery (plot 302). Thus, CAD 10 may be more retarded compared to CAD 1. Additionally, the split DI ratio may be adjusted based on fuel alcohol content.

In this way, spark plug fouling may be reduced in vehicles with DI only engines that are operated with frequent start/stops, and low rpm operations in the pre-delivery state. The technical effect of using a single intake stroke injection and additionally advancing the timing of intake direct injection during pre-delivery state is that sufficient time may be provided for mixing of the injected fuel with air in the cylinder. As a result, there may be reduced pockets of rich combustion, and hence reducing spark plug fouling. Overall, engine performance may be enhanced.

For a PFI/DI engine in pre-delivery, fuel may be injected only via the port injector (plot 320). Herein all the fuel is injected via only the port injector (fuel is not injected via the direct injector). Specifically, the direct injector may be disabled, and the fuel may be delivered only using the port injector during the green start in the PFI/DI engine. The port-injected fuel (plot 320) may be injected in the exhaust stroke. The fuel may be injected via the port injector during an exhaust stroke of a previous engine cycle. In some examples, when the engine temperature is below a threshold temperature (e.g., during an engine cold-start), the PFI/DI engine may be fueled using only the direct injectors. In such examples, the injection profile of the engine may be similar to plots 316 and 318 shown in map 325 of a DI-only engine where a portion of the fuel is injected during the intake stroke, and the remaining portion of the fuel is delivered during the compression stroke.

As described previously, the DI may be intermittently enabled, as shown in plot 326, responsive to selected conditions including one or more of cleaning a DI injector tip, cooling the DI injector, allowing air in the fuel rail to be purged into the combustion chamber, and activating a DI pump that has been shut down for a longer than threshold period of time.

Herein, a portion of the fuel is injected via the port injector (plot 324), and the remaining fuel is injected via the direct injector (plot 326). The port-injected fuel (plot 324) may be injected in the exhaust stroke, while the direct injected fuel (plot 326) may be injected in the intake stroke. In one example, the portion of fuel port injected into the cylinder is similar to the portion of fuel that is direct injected as the intake stroke injection. Herein, the PFI/DI split ratio may be defined as the amount of fuel injected using a PFI to the amount of fuel injected using a DI. For example, injecting a larger amount of fuel for a combustion event via port injector compared to amount of fuel injected via direct injector may result in a higher PFI/DI split ratio. Herein, the fuel may be injected via the port injector during an exhaust stroke of a previous engine cycle. In one example, 30% of the fuel may be port injected, while the remaining 70% may be direct injected. In one example, fuel may not be direct injected during the compression stroke. In another example, a first portion of the fuel may be port injected (plot 328), a second portion of the fuel may be direct injected during intake stroke (plot 330), and a third portion of the fuel may be injected during compression (plot 332) to ensure ignition robustness. Each of the first, second, and third portions may be adjusted based on engine operating conditions and soot generation requirements. By splitting the direct injection so that some of the direct injected fuel is injected during the intake stroke and the remaining part of the direct injected fuel is injected during the compression stroke, the catalyst light-off temperature can be attained without raising exhaust particulate matter (PM) emissions and degrading engine combustion stability. Overall, engine performance is enhanced, exhaust emissions are enhanced, and fuel economy is improved.

In this way, spark plug fouling may be reduced in vehicles with PFI/DI engines and DI only engine that are operated with frequent start/stops, and low rpm operations in the pre-delivery state. In DI only engines, the technical effect of using a single intake stroke injection and additionally advancing the timing of intake direct injection during pre-delivery state is that sufficient time may be provided for mixing of the injected fuel with air in the cylinder. As a result, there may be reduced pockets of rich combustion, and hence reducing spark plug fouling. Overall, engine performance may be enhanced.

The systems and methods described above provide for a method of an engine comprising operating an engine with a first direct injection fueling strategy including single intake direct injection on an engine start when in a pre-delivery state; and operating the engine with a second, different direct injection fueling strategy including split direct injection on the engine start when in a post-delivery state. In a first example of the method, the method may additionally or alternatively include wherein the single intake direct injection includes a single intake stroke injection. A second example of the method optionally includes the first example, and further includes wherein the split direct injection includes at least a first, intake stroke injection and a second, compression stroke injection. A third example of the method optionally includes one or more of the first and the second examples, and further includes wherein an injection timing of the single intake stroke injection is earlier than the injection timing of the first intake stroke injection.

A fourth example of the method optionally includes one or more of the first through the third examples, and further includes wherein a ratio of fuel delivered in the first intake stroke injection relative to the second compression stroke injection is adjusted based on each of combustion event number since the engine start, and engine temperature. A fifth example of method optionally includes one or more of the first through the fourth examples, and further includes wherein the ratio of fuel delivered in the compression stroke is increased as the combustion event number increases and as the engine temperature increases. A sixth example of method optionally includes one or more of the first through the fifth examples, and further includes wherein the ratio is further adjusted based on fuel alcohol content. A seventh example of method optionally includes one or more of the first through the sixth examples, and further includes wherein, during the post-delivery state, maintaining operation of the engine with the first strategy for a threshold number of combustion events since the engine start in the pre-delivery state, and after the threshold number of combustion events have elapsed, transitioning to injecting at least some fuel to the engine during a compression stroke. An eighth example of method optionally includes one or more of the first through the seventh examples, and further includes wherein the engine is configured for direct injection only. A ninth example of method optionally includes one or more of the first through the eighth examples, and further includes maintaining operation of the engine with the first strategy until an inferred spark plug temperature is higher than a threshold temperature, and then transitioning to the second fueling strategy. A tenth example of method optionally includes one or more of the first through the ninth examples, and further includes wherein the engine start when in the pre-delivery state is a first green engine start, the method further comprising, continuing operation of the engine with the first strategy until one or more of an integrated value based on a number of start events since the first green start and a duration of each of the number of start events since the first green start is higher than a threshold value, a number of miles since the first green start or an integrated miles during a single vehicle drive cycle is higher than a threshold mileage, and the pre-delivery state is deactivated.

The systems and methods described above also provide for a method of an engine comprising in response to an engine green start, cranking the engine by injecting fuel from a direct injector with a split ratio of fuel direct injected during an intake stroke relative to fuel direct injection during a compression stroke, and adjusting each of an average timing of the injecting fuel from the direct injector and the split ratio based on each of a number of combustion events after a threshold number of engine starts since the engine green start is reached. In a first example of the method, the method may additionally or alternatively include wherein the adjusting includes operating with an earlier average timing of the injection during the engine green start (or the first engine start) and then retarding the average timing from the earlier average timing as the number of number of engine starts since the first engine start increase. A second example of the method optionally includes the first example, and further includes wherein the adjusting further comprising operating with a larger ratio of fuel in the intake stroke relative to the compression stroke during the first engine start and then increasing the ratio of fuel in the intake stroke while correspondingly decreasing the ratio of fuel in the compression stroke as the number of combustion events since the first engine start increase. A third example of the method optionally includes one or more of the first and the second examples, and further includes wherein the adjusting includes operating with a first earlier average timing of the injection and a larger ratio of fuel in the intake stroke relative to the compression stroke for the first engine start and until an integrated value of the number of engine starts since the first start and a duration of each of the number of engine start is higher than a threshold value, the threshold based on an engine temperature. A fourth example of the method optionally includes one or more of the first through the third examples, and further includes wherein the threshold is further based on fuel alcohol content.

The systems and methods described above provide for a system for a vehicle, comprising an engine including a cylinder, a direct injector, and a controller with computer-readable instructions stored on non-transitory memory for: for a first engine start of the vehicle following vehicle assembly, operating the engine with a single intake stroke direct injection, and operating the engine with a split ratio of fuel direct injected during an intake stroke relative to fuel direct injection during a compression stroke after a threshold number of engine starts have elapsed. In a first example of the system, the system may additionally or alternatively include wherein each of an average timing of the injecting fuel from the direct injector and the split ratio are adjusted based on a number of combustion events since the first engine start. A second example of the system optionally includes the first example, and further includes wherein the controller includes further instructions for retarding the average timing of the injecting fuel from the direct injector after the number of engine starts since the first engine start reaches the threshold number. A third example of the system optionally includes one or more of the first and the second examples, and further includes wherein the controller includes further instructions for increasing the split ratio after the number of engine starts reaches the threshold number.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
   an engine including a cylinder;
   a direct injector; and
   a controller with computer-readable instructions stored on non-transitory memory for:
      for a first engine start of the vehicle following vehicle assembly, operating the engine with a single intake stroke direct injection; and
      operating the engine with a split ratio of fuel direct injected during an intake stroke relative to fuel direct injection during a compression stroke after a threshold number of engine starts have elapsed.

2. The system of claim 1, wherein each of an average timing of the injecting fuel from the direct injector and the split ratio are adjusted based on a number of combustion events since the first engine start.

3. The system of claim 1, wherein the controller includes further instructions for:
   retarding the average timing of the injecting fuel from the direct injector after a number of engine starts since the first engine start reaches the threshold number.

4. The system of claim 3, wherein the controller includes further instructions for:
   increasing the split ratio after the number of engine starts reaches the threshold number.

5. A method for an engine in a vehicle, comprising:
in response to an engine green start,
cranking the engine by injecting fuel from a direct injector with a split ratio of fuel direct injected during an intake stroke relative to fuel direct injection during a compression stroke; and
adjusting each of an average timing of the injecting fuel from the direct injector and the split ratio based on each of a number of combustion events after a threshold number of engine starts since the engine green start is reached.

6. The method of claim 5, wherein the adjusting includes operating with an earlier average timing of the injection during the engine green start and then retarding the average timing from the earlier average timing as the number of engine starts since the engine green start increase.

7. The method of claim 5, wherein the adjusting further comprising operating with a larger ratio of fuel in the intake stroke relative to the compression stroke during the engine green start and then increasing the ratio of fuel in the intake stroke while correspondingly decreasing the ratio of fuel in the compression stroke as the number of combustion events since the engine green start increase.

8. The method of claim 5, wherein the adjusting includes operating with a first earlier average timing of the injection and a larger ratio of fuel in the intake stroke relative to the compression stroke for the engine green start and until an integrated value of the number of engine starts since the engine green start and a duration of each of the number of engine start is higher than a threshold value, the threshold based on an engine temperature.

9. The method of claim 8, wherein the threshold is further based on fuel alcohol content.

10. A method of an engine, comprising:
operating an engine with a first direct injection fueling strategy including single intake direct injection on an engine start when in a pre-delivery state; and
operating the engine with a second, different direct injection fueling strategy including split direct injection on the engine start when in a post-delivery state.

11. The method of claim 10, wherein the single intake direct injection includes a single intake stroke injection.

12. The method of claim 11, wherein the split direct injection includes at least a first, intake stroke injection and a second, compression stroke injection.

13. The method of claim 12, wherein an injection timing of the single intake stroke injection is earlier than an injection timing of the first intake stroke injection.

14. The method of claim 12, wherein a ratio of fuel delivered in the first intake stroke injection relative to the second compression stroke injection is adjusted based on each of combustion event number since the engine start, and engine temperature.

15. The method of claim 14, wherein the ratio of fuel delivered in the compression stroke is increased as the combustion event number increases and as the engine temperature increases.

16. The method of claim 14, wherein the ratio is further adjusted based on fuel alcohol content.

17. The method of claim 10, further comprising, during the post-delivery state, maintaining operation of the engine with the first fueling strategy for a threshold number of combustion events since the engine start in the pre-delivery state, and after the threshold number of combustion events have elapsed, transitioning to injecting at least some fuel to the engine during a compression stroke.

18. The method of claim 10, wherein the engine is configured for direct injection only.

19. The method of claim 10, further comprising, maintaining operation of the engine with the first fueling strategy until an inferred spark plug temperature is higher than a threshold temperature, and then transitioning to the second fueling strategy.

20. The method of claim 10, wherein the engine start when in the pre-delivery state is a first green engine start, the method further comprising, continuing operation of the engine with the first fueling strategy until one or more of an integrated value based on a number of start events since the first green engine start and a duration of each of the number of start events since the first green engine start is higher than a threshold value, a number of miles since the first green engine start or an integrated miles during a single vehicle drive cycle is higher than a threshold mileage, and the pre-delivery state is deactivated.

* * * * *